(12) United States Patent
Jiang et al.

(10) Patent No.: US 11,878,480 B2
(45) Date of Patent: Jan. 23, 2024

(54) WAFER HOLDER BAND FOR MOLD INJECTION PROCESS

(71) Applicant: Essilor International, Charenton-le-Pont (FR)

(72) Inventors: Peiqi Jiang, Dallas, TX (US); Arnaud Glacet, Dallas, TX (US); Zbigniew Tokarski, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 346 days.

(21) Appl. No.: 17/120,763

(22) Filed: Dec. 14, 2020

(65) Prior Publication Data

US 2021/0178711 A1    Jun. 17, 2021

(30) Foreign Application Priority Data

Dec. 17, 2019   (EP) ..................................... 19306666

(51) Int. Cl.
    B29D 11/00        (2006.01)
(52) U.S. Cl.
    CPC ................. B29D 11/0048 (2013.01)
(58) Field of Classification Search
    None
    See application file for complete search history.

(56) References Cited

U.S. PATENT DOCUMENTS

| 5,286,419 A | 2/1994 | Van Ligten et al. |
| 2004/0125337 A1 | 7/2004 | Boulineau et al. |
| 2017/0299782 A1 | 10/2017 | Tamura et al. |

FOREIGN PATENT DOCUMENTS

| EP | 3 593 981 | | 1/2020 |
| JP | WO2003/008171 | * | 11/2004 |
| WO | 88/07924 | | 10/1988 |
| WO | 2004/011235 | | 2/2004 |
| WO | 2007/096425 | | 8/2007 |
| WO | 2017/197185 | | 11/2017 |

OTHER PUBLICATIONS

Extended European Search Report for EP 19306666.9 dated Jun. 10, 2020, 12 pages.

* cited by examiner

*Primary Examiner* — Mathieu D Vargot
(74) *Attorney, Agent, or Firm* — NIXON & VANDERHYE

(57) ABSTRACT

The present disclosure includes systems, devices, and methods for preventing contamination during formation of an optical article. In some implementations, a device for preventing contamination of a mold cavity during injection molding of a function wafer includes a containment band having an annular base that defines a first opening configured to receive a functional wafer. The device also includes one or more sidewalls that project a first direction from and surround at least a portion of the first opening. The one or more sidewalls may be configured such that, during formation of an optical article, a first portion of the functional wafer is in contact with the one or more sidewalls.

14 Claims, 6 Drawing Sheets

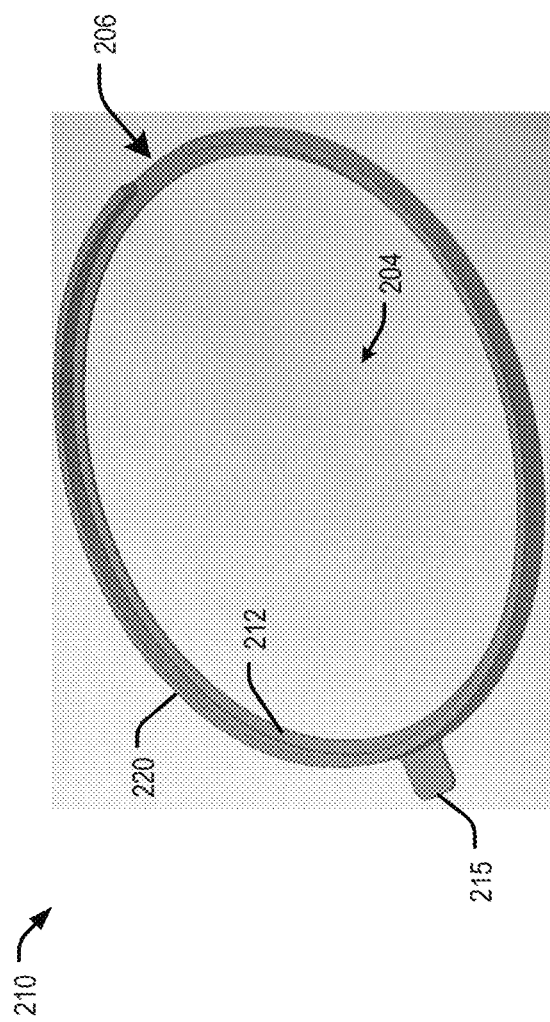
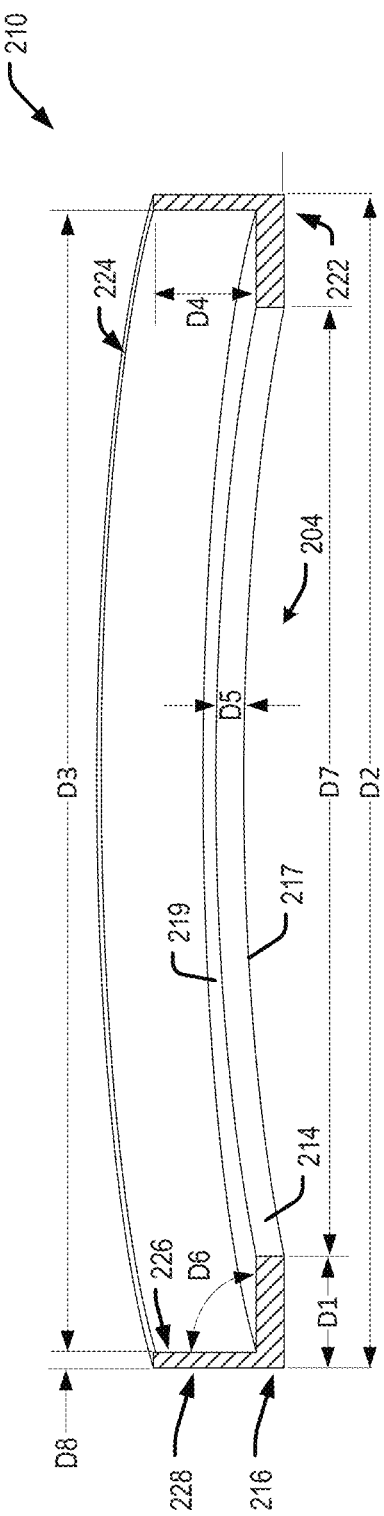
FIG. 2A
FIG. 2B

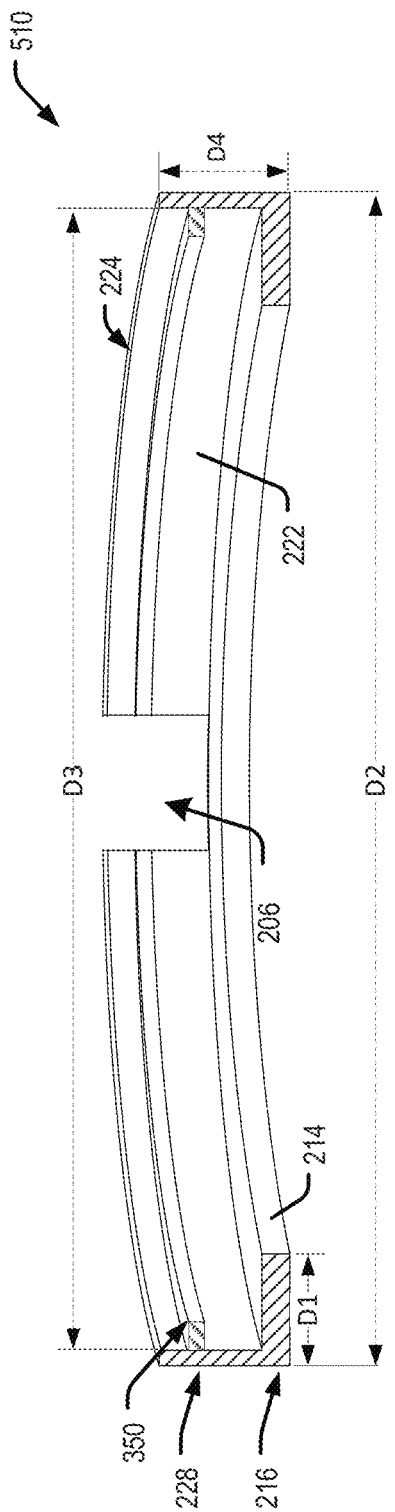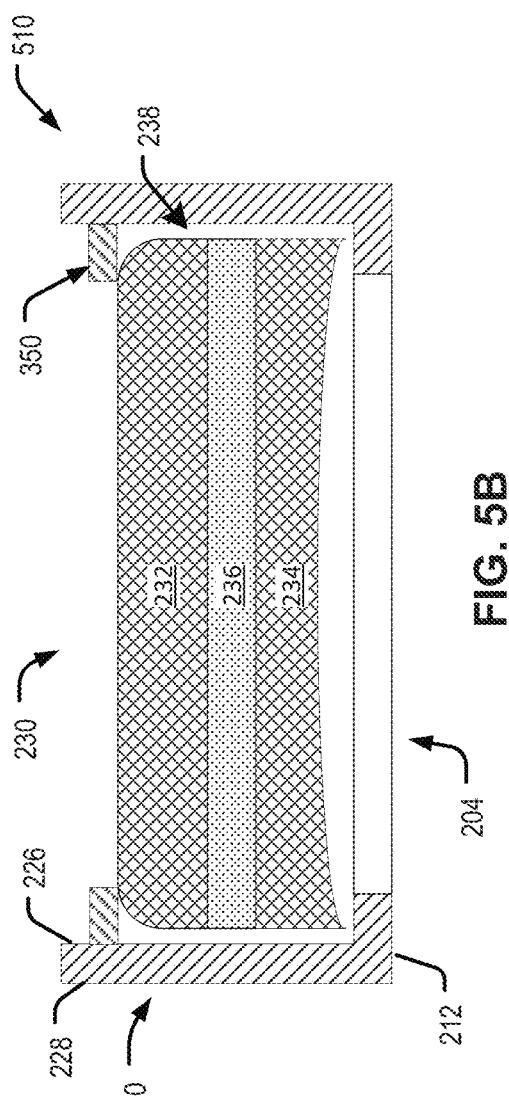

WAFER HOLDER BAND FOR MOLD INJECTION PROCESS

CROSS-REFERENCE TO RELATED APPLICATIONS

This application claims priority to EP 19306666.9 filed Dec. 17, 2019, the entire contents of each of which are hereby incorporated by reference.

TECHNICAL FIELD

The present disclosure relates generally to optical articles and more particularly, but without limitation, to the manufacture of a lens.

BACKGROUND

Optical articles, such as lenses, are typically made from functional wafers. A wafer may include a center layer of soft thermoplastic material (e.g., soft thermoplastic layer or soft adhesive layer) as it offers certain advantages, such as soft polymer segment, ductility, and chemical compatibility during the formation of the wafer and the optical article. During formation of an optical article, the wafer may be subject to one or more various manufacturing processes. For example, a flat wafer is typically transformed (e.g., thermoformed) from a flat circular wafer to a concave dome-shaped functional wafer to correspond to a base curve of the optical article. As another example, an injection overmolding process may be performed on the thermoformed functional wafer to produce corrective or non-corrective eyeglass lenses.

During formation of an optical article, several complications arise based on use the soft thermoplastic layer of the wafer. For example, complications may arise during the thermoforming process, the injection molding process, or both. To illustrate, to maintain the desired ductility of the wafer, the soft thermoplastic layer of the wafer typically has a glass transition temperature below that of the injection molding temperature. During thermoforming, elevated temperature, pressure, etc., may fluidize the thermoplastic layer and result in outflow (e.g., edge bleeding) of the soft thermoplastic layer. Additionally, or alternatively, during injection molding, the soft thermoplastic layer may become fluid from the temperature of an injection material and result in outflow (e.g., edge bleeding) of the soft thermoplastic layer. This edge bleeding creates unwanted contamination of an insert and/or a mold cavity and/or between the outer side surface of the insert and the mold cavity walls. The contamination can reduce production yields and increase down time for mold cleaning. Additionally, the contamination can lead to imperfections in subsequent lens formation, such as non-uniform thickness of the soft thermoplastic layer that results in optical distortions or cosmetic issues in the optical article (e.g., a lens). Some conventional approaches to prevent edge bleeding have included specialized wafer designs in which outer layers have a larger diameter than the soft, central layer to prevent the central layer from bleeding into the mold cavity. However, such wafer geometry is difficult to produce on a large scale and the soft layer is still visible after injection molding. Other conventional approaches have attempted to seal a wafer edge via thermal or chemical means, or using a special wafer edge cutting design. However, such techniques are often complex, reduce a quality of a final lens product (e.g., the thermal or chemical means can deteriorate materials of the wafer), and increase production time (e.g., sealing the wafer edge or the special wafer edge cutting design adds time and cost to manufacturing). Accordingly, such solutions offer little help to reduce manufacturing time and produce lenses with undesirable cosmetic properties.

SUMMARY

The present disclosure is generally related to systems, devices, and methods for manufacturing an optical article and an apparatuses including the optical article. For example, a device (or an apparatus) for manufacturing an optical article may include a containment band that is operable with a functional wafer. The containment band may be configured to reduce or prevent insert and/or mold cavity contamination from a soft thermoplastic layer of the functional wafer during processing, such as thermoforming or injection molding. To illustrate, the containment band may include an annular base and one or more sidewalls. The annular base may define a first opening and the one or more sidewalls may extend from the annular base and surround at least a portion of the first opening. In some implementations, the first opening is configured to receive and hold the wafer, the one or more sidewalls may include a rib or rim configured to aid in retaining a wafer in position (e.g., between the annular base and the rib/rim), or a combination thereof. During processing of the wafer, the containment band may capture or retain potential outflow of material from the soft thermoplastic layer to mitigate contamination, such as potential contamination during the injection molding process. In some implementations, the one or more sidewalls may define one or more second openings and/or the containment band includes a tab extending from the annular base or a sidewall. The tab may enable placement of the containment band and wafer into a mold cavity in a desired or predetermined orientation. During formation of the optical article, a first portion of the wafer can be in contact with the one or more sidewalls while each of the one or more second openings is configured to enable passage of an injection material to form a semi-finished (SF) lens product. In this manner, the containment band enables injection of molten material injected and reduced or prevents contamination of outflow material.

The systems, apparatuses, and methods described herein advantageously include or use a containment band with a functional wafer that may bleed-out any layers that are fluidized by the high temperatures and pressures experienced inside the product cavities during injection molding. To illustrate, the containment band is configured to reduce or prevent the bleeding out (e.g., oozing out) of a thermoplastic optically functional layer (e.g., photochromic layer) of a multilayered laminate wafer construction during injection molding. The containment band is able to be easily manufactured (e.g., via a 3D printing process, an injection molding process, or other means) with minimal cost and can be coupled to or assembled with a wafer manually or by a simple mechanical means without significantly increasing production complexity or time. Additionally, or alternatively, the containment band does not need to be removed after injection molding and may be included in a final semi-finished (SF) lens product such that use of the containment band does not increase production time, cost, or complexity. Thus, systems, apparatuses, and methods described herein enable production of optical articles with minimized risk of contamination of the mold cavity and/or without altering wafer geometry or sacrificing the cosmetic appearance of the lenses.

In some of the foregoing implementations of the present apparatuses includes a containment band for use in making an article. The containment band includes an annular base that defines a first opening. In some implementations, the first opening is configured to receive at least a portion of a functional wafer. The containment band also includes one or more sidewalls that project a first direction from and surround at least a portion of the first opening, the one or more sidewalls defining one or more second openings. During formation of the article, a first portion of the functional wafer is in contact with the one or more sidewalls and each of the one or more second openings is configured to enable passage of an injection material to form the article.

In some implementations of the present apparatuses, the containment band include an alignment member (e.g., a tab) that extends from the annular base in a second direction that is away from the first opening. Additionally, or alternatively, the one or more sidewalls include an inner surface that faces the first opening and an outer surface that is opposite the inner surface. In one or more implementations, the one or sidewalls include multiple sidewalls. In some implementations, the containment band includes a securement member (e.g., a rib) extending from at least a portion of the inner surface of at least one sidewall of the one or more sidewalls.

In some implementations of the present apparatuses, the annular base includes a first surface that defines the first opening and a second surface that defines a periphery of the annular base. In some such implementations, an alignment member (e.g., a tab) extends from the second surface. Additionally, or alternatively, the one or more sidewalls may be positioned proximate to the second surface and extend from the annular base in a direction that is substantially perpendicular to the base.

In some implementations of the present apparatuses, an angle between the sidewall and the annular base is between 80 and 150 degrees, an outer diameter of the annular base that is between 50 to 150 mm, and a combination thereof. Additionally, or alternatively, the containment band may include a height of the sidewall, measured from a top surface of the annular base, which is between 1 to 5 millimeters (mm).

In some of the foregoing implementations of the present apparatuses (e.g., optical articles—glasses, lenses, etc.), an optical article includes a wafer and a containment band for preventing mold contamination during manufacture of the optical article. Wafer may include one or more layers of thermoplastic matrix material. In some implementations, the containment band includes a base having a periphery and a sidewall extending from the periphery of the base to contact the wafer. In some such implementations, the sidewall defines one or more openings occupied by mold material. The sidewall may surround a majority of the wafer. In some of the foregoing implementations, the wafer includes at least one thermoplastic layer and the wafer is disposed within the periphery of the base and in contact with an inner surface of the sidewall. Additionally, or alternatively, the containment band includes a thermoplastic polymer having a higher glass transition temperature than at least one thermoplastic layer of the wafer.

In some of the foregoing implementations of the present methods (e.g., of forming a wafer an optical article), a method includes disposing a wafer into a mold cavity. The wafer has a containment band coupled to and covering an outer periphery of the wafer. The method also includes injecting a moldable material into the mold cavity. In some such implementations, the method may also include inserting the wafer into the containment band such that the containment band is disposed around at least a majority of the outer periphery of the wafer.

In some implementations of the present methods, the method further includes setting the moldable material to form a semi-finished lens including the wafer, the containment band, and the moldable material. Additionally, or alternatively, the method may also include forming a finished lens from the semi-finished lens by removing at least a portion of the containment band from being coupled to the wafer.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 2A is a perspective view of an example of a containment band.

FIG. 2B is a sectional view of an example of the containment band of FIG. 2A.

FIG. 5A is a sectional view of another example of a containment band.

FIG. 5B is a sectional side view of the wafer and containment band of FIG. 5A.

DETAILED DESCRIPTION

Figure 1:
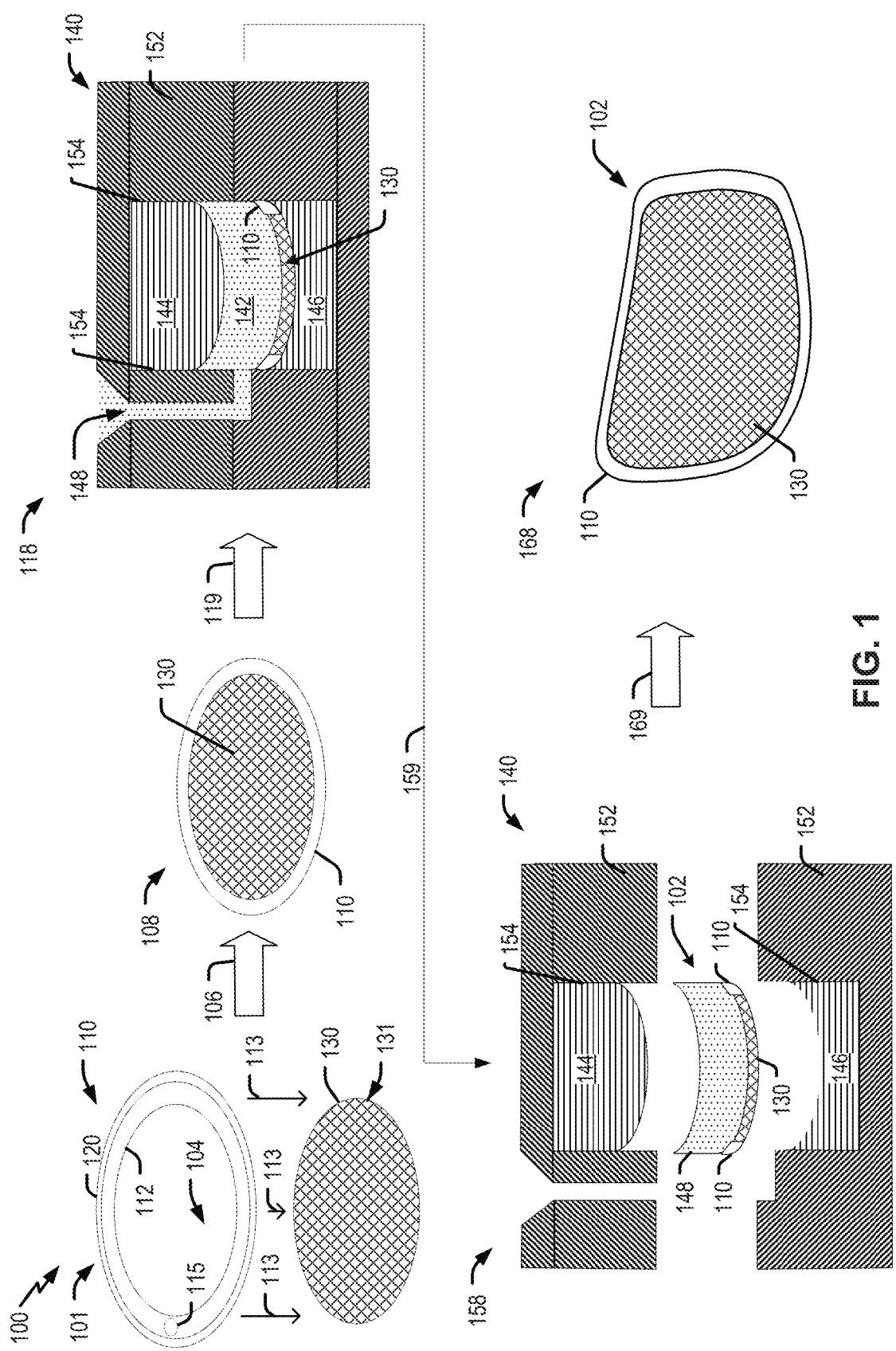
FIG. 1 is a diagram that illustrates an example of stages of a process of an optical system for manufacturing an optical article.

Referring to FIG. 1, a diagram of illustrative stages of manufacturing an optical article is shown. For example, a system 100 may be configured to perform the stages of manufacturing the optical article, such as an optical lens (e.g., a semi-finished (SF) lens product). System 100 may be configured to produce a non-contaminating optical wafer for use in manufacture of the optical article, such as a polarized or photochromic plastic lens.

At a first stage 101, a containment band 110 and a wafer 130 may be provided or formed. Wafer 130 (e.g., functional polycarbonate wafer) may include one or more thermoplastic layers and have an outer edge 131 (e.g., a sidewall) that extends between a first surface (e.g., an upper surface) and a second surface (e.g., a lower surface) that is opposite the first surface. For example, wafer 130 may include a thermoplastic layer (e.g., thermoplastic polyurethane (TPU) (e.g., amorphous TPU, Tecoflex EG85A, Tecoflex EG80A, Estane ALR E77A-V, Estane AG 8451, Estane VSN F5000, or the like) or semi-crystalline Polyether-block-polyamides (PEBA) (e.g., Pebax 5533, Pebax 4533, Pebax 4033, Pellethane 80A or the like), a soft adhesive layer, or any other thermoplastic elastomeric material, that is interposed between two outer layers. The two outer layers may each include a transparent polycarbonate film (e.g., Lexan PC, and/or the like) that has a higher glass transition temperature (or melt temperature) than the thermoplastic layer. In some implementations, the thermoplastic layer (e.g., a soft thermoplastic layer or a soft adhesive layer) may include one or more additives, such as an optical additive and/or a process additive (e.g., photochromic dye, polarizing dye, tint dye, dye absorbers of selective wavelengths, electrochromic dyes, stabilizers, flow modifiers, and/or the like). The soft thermoplastic layer may be configured to deform and flow under typical molding pressures and temperatures. Wafer 130 may have an oval shape, circular shape (e.g., circular disk), or other shape that can be flat or convex (e.g., semi-spherical dome shape) to correspond to a desired base curve of the optical article (e.g., 102). In some implementations, wafer 130 may be formed or cut from a laminate (e.g., a stack) that includes the thermoplastic layer positioned between the two outer layers. Additionally, or alternatively, thermoforming may be performed on wafer 130 at first stage 101.

Containment band 110 (also referred to as a band) is configured to secure wafer 130 during one or more manufacturing process, such as coating process, as described further herein with reference to stage 118. Containment band 110 includes an annular base 112, such as a ring, that defines a first opening 104. Containment band 110 also includes one or more sidewalls 120 that project from and surround at least a portion of first opening 104. For example, the one or more sidewalls 120 project from annular base 112 in a first direction. In some implementations, the one or more sidewalls 120 defining one or more second openings. For example, the one or more second openings may include or corresponds to gaps (e.g., spaces) between ends of the one or more sidewalls 120. Containment band 110 may include one or more additional features, such as an alignment member (e.g., a tab) extending from annular base 112, a securement member (e.g., a rim) extending from at least a portion of the inner surface of at least one sidewall (e.g., 112), or a combination thereof, as illustrative, non-limiting examples. Examples, of containment band 110 are described further herein at least with reference to FIGS. 2A, 2B, 2C, 2D, 3, 4, and 5A-5B.

In some implementations, containment band 110 may include one or more additional features 115. For example, one or more, features 115 may include or correspond to a tab, notch, second opening, rib, groove, and/or the like.

Examples of one or more features 115 are described further herein at least with reference to FIGS. 2A, 2C, 3, 4, 5A and 5B. Features 115 may assist during the manufacturing process such as, for example, by facilitating coupling between containment band and wafer 130, enabling contamination free injection molding of the wafer, alignment member recessed into the annual base 112, or the like.

Containment band 110 is configured to be coupled to wafer 130 (as indicated by arrows 113). For example, containment band 110 may be coupled to wafer 130 such that a first portion of wafer 130 is in contact with the one or more sidewalls 120, a second portion of wafer 130 is in contact with annular base 112, or a combination thereof. In implementations where containment band 110 includes the one or more second openings, each of the one or more second openings may be configured to enable passage of an injection material during formation of an article, such as an optical article.

Containment band 110 may be circular, elliptical, or otherwise shaped to secure wafer 130 as described herein. For example, containment band 110 may surround a portion (up to and including an entirety) of wafer 130 to prevent the soft thermoplastic layer of wafer 130 from oozing out of the wafer (e.g., edge bleed). In such implementations, containment band 110 may include any suitable material that will remain rigid when subjected to pressure and temperatures commonly associated with injection molding processes. For example, containment band 110 may include a semi-transparent or transparent polymer (e.g., nylon, polycarbonate, polyacrylates, polyesters, polyethers, acrylates (e.g., PMMA), acrylonitrile butadiene styrene, copolymers, or the like), metal, ceramic, any other suitable material, or combination thereof. In some implementations, containment band 110 includes a polymer (e.g., polycarbonate) that can be produced by injection molding, 3D printing, or the like. In this way, containment band 110 may be inexpensively and quickly mass produced thereby allowing containment band 110 to be implemented in existing optical article manufacturing process with only a nominal increase in cost and manufacturing time.

Containment band 110 and wafer 130 are provided from first stage 101 to a second stage 108 indicated by arrow 106. At second stage 108, containment band 110 and wafer 130 are coupled. For example, containment band 110 may surround at least a portion of wafer 130 to cover outer edge 131 or perimeter of wafer 130. Containment band 110 and wafer 130 may be coupled together in any suitable manner such as, for example, via friction, an adhesive layer, or one or more additional components, or a combination thereof.

Containment band 110 and wafer 130 are provided from second stage 108 to a third stage 118 as indicated by arrow 119. At third stage 118, containment band 110 and wafer 130 may be disposed within a mold device 140 configured for an injection molding processes.

Mold device 140 may include a convex insert 144, a concave insert 146, and a mold block 152 that are movable relative to one another between an open configuration (e.g., shown at stage 158) and a closed configuration (e.g., shown at third stage 118) to define a cavity 142. To illustrate, mold inserts 144, 146 may be disposed within a space defined by sidewalls 154 of mold device (e.g., of mold block 152). The surfaces of the inserts 144, 146 and the sidewall 154 of the mold device 152 may cooperate to define cavity 142. Containment band 110 and wafer 130 may be disposed within cavity 142 and a moldable material 148 may be injected onto wafer 130 to form an article, such as a semi-finished lens product. Although mold device 140 defines a single cavity 142, the mold device may include multiple pairs of inserts (e.g., 144 and 146) configured to be inserted within respective sidewalls of the mold block that each cooperate to define a cavity (e.g., 142) configured to receive a respective containment band (e.g., 110) and wafer (e.g., 130). In some implementations, containment band 110 surrounds wafer 130 and is positioned within cavity 142 of mold device 140 such that the containment band 110 the wafer 130 is secured within cavity 142 and contacts a surface of convex insert 144, concave insert 146, and/or sidewall 154 of mold block 152. In this way, wafer 130 is prevented from moving or shifting during an injection process which allows for high-quality optics in the final optical article (e.g., lens). In some implementations, containment band 110 may include an alignment member (e.g., a tab) that is configured to be received in a corresponding recess or cavity of mold device 140 to enable proper positioning and/or alignment of containment band 110 and wafer 130 within cavity 142 of mold device 140.

Insert 146 and insert 144 may be sized and shaped such that when they are coupled together, the mold insert 144 and the mold insert 146 cooperate to define cavity 142 that corresponds to a desired shape and thickness of optical article 102. For example, mold insert 144 may include a convex, concave, or plano surface and mold insert 146 may include a convex, concave, or plano surface having a same, similar, different, or larger or smaller, base curve (e.g., radius of curvature) to the curved surface of the mold insert 144. Insert 146 and insert 144 may define surfaces configured to accept a corresponding concave functional wafer (e.g., 130) having a base curve greater than, equal to, or between any of the following: 0.25, 1.75, 3.00, 4.00, 4.50, 5.50, 6.00, 6.50, 7.25, 8.00, or 8.50.

As shown, moldable material 148 (e.g., a matrix or substrate material) is injected into cavity 142 of mold device 140 while wafer 130 is positioned within the cavity. Moldable material 148 may include a transparent or semi-transparent thermoplastic material, such as polycarbonate, thermoplastic urethane, polyacrylate, polyester, copolyester, polymethacrylate, poly(methyl methacrylate), polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof. Moldable material 148 may be heated, into a molten state, and injected onto wafer 130 in the molten state such that the moldable material becomes fuse-bonded to the wafer and takes the shape of cavity 142. For example, moldable material 148 is injected into cavity 142 at a high temperature (up to 300° C.) and high pressure (500-30,000 psi) to from optical article 102. Injection of moldable material 148 onto wafer 130 may cause the soft thermoplastic layer of the wafer to transform into a low viscous (e.g., liquid) state. For example, moldable material 148 may be injected at a temperature that is much greater than a glass transition temperature of the soft thermoplastic layer such that the inner layer becomes fluid (e.g., a low viscous liquid) and is capable of flowing out under pressure (i.e., oozing out) from wafer 130 onto a surface that defines cavity 142. In such implementations, the soft thermoplastic layer of wafer 130 may be contained by containment band 110 such that the fluid material does not contaminate (e.g., contact) convex insert 144, concave insert 146, mold block 152, and/or other components of mold device 140. Likewise, containment band 110 may prevent liquefied material from flowing between an outer side surface of inserts (e.g., 144, 146) and the sidewall(s) (e.g., 154) of mold block 152.

Accordingly, containment band 110 may reduce or eliminate contamination of one or more components (e.g., mold insert 146, mold insert 144, mold block 152) of system 100, thus decreasing manufacturing time of optical article.

Wafer 130, containment band 110, and moldable material 148 are provided to a fourth stage 158 as indicated by an arrow 159. At fourth stage 158, wafer 130, containment band 110, and moldable material 148 are removed from cavity 142. For example, after moldable material 148 solidifies in cavity 142, receiver 144 and/or insert 146 can be moved to an open configuration and optical article may be removed from mold device 140.

In some implementations, one or more finishing processes may, but need not be, performed on to wafer 130 and moldable material 148 to form optical article 102, such as a lens, glasses, goggles, other form of eyewear, etc. For example, some in some implementations, optical article 102 is proved to a fifth stage 168 as indicated by an arrow 169. At fifth stage 168, a finishing process such as, for example, coating, stamping, printing, grinding, polishing, buffing, etching, edging, machining or other process may occur to produce a finished optical article. As shown, wafer 130, moldable material 148, and containment band 110 are post processed (e.g., edged) to form a shaped lens, however, in other implementations, article 102 will contain a similar shape as cavity 142 (e.g., rounded). In some implementations, containment band 110 may be part of the finished lens, while in other implementations, the containment band may be removed from optical article 102 during formation of the finished lens. For example, containment band 110 may be removed from optical article, by a grinding process, a chemical process (e.g., containment band may be made of a releasable material such as for removal and reuse or recycle), or other known process. As shown, optical article 102 includes containment band 110, wafer 130, and solidified moldable material (e.g., 148).

In some implementations, system 100 includes a control device (not shown) which includes a processor and a memory. Memory may include read only memory (ROM) devices (e.g., programmable read-only memory (PROM), erasable programmable read-only memory (EPROM), electrically erasable programmable read-only memory (EEPROM), optical storage, or the like), random-access memory (RAM) devices (e.g., synchronous RAM (SRAM), dynamic RAM (DRAM), synchronous dynamic RAM (SDRAM), or the like), one or more HDDs, flash memory devices, SSDs, other devices configured to store data in a persistent or non-persistent state, or a combination of different memory devices. Memory may store instructions that, when executed by processor, cause processor to perform the operations described herein. Although described as including processor, in other implementations, control device can include application specific integrated circuits (ASIC), field-programmable gate arrays (FPGA), very large scale integrated (VLSI) circuits, or other circuitry. Additionally, control device may include an interface, such as a wired interface or a wireless interface, to enable communication with one or more components of system 100. Control device may also include a user interface to enable a user to control operations of system 100.

The control device may be configured to control operations of one or more components of system 100. For example, control device may be configured to control one or more of laminate equipment, a cutter device or tool to cut wafers from a laminate, a thermoforming device, mold device 140, formation of wafer 130, the formation of containment band 110, and/or coupling of wafer 130 and containment band 110. To illustrate, control device may be coupled or connected to a 3D printer, injection molding device, or another manufacturing component, or a combination thereof, to communicate with the component to form containment band 110. As another example, the control device may control operation of one or more actuators (not shown) to cause movement (e.g., translation, rotation, and/or the like) of mold device 140.

Although described as a single control device (e.g., a single processor), in other implementations, the control device may include multiple devices or processors (e.g., a processor system) that perform the control operations. For example, the control device may be a distributed system with multiple processors that each perform some of the control operations described herein. To further illustrate, a first device or processor may control formation of containment band 110 and a second device or processor may control operation of mold device 140.

In some implementations, containment band 110 is used for making optical article 102. For example, containment band 110 may include an annular base 112 that defines a first opening 104 and one or more sidewalls 120 that project from and surround at least a portion of the first opening. In some implementations, one or more sidewalls 120 may define one or more second openings and during formation of optical article 102, a first portion of wafer 130 may be in contact with one or more sidewalls 120 and each of the one or more second openings are configured enable passage of injection material 148 to form optical article 102.

Figure 2C:
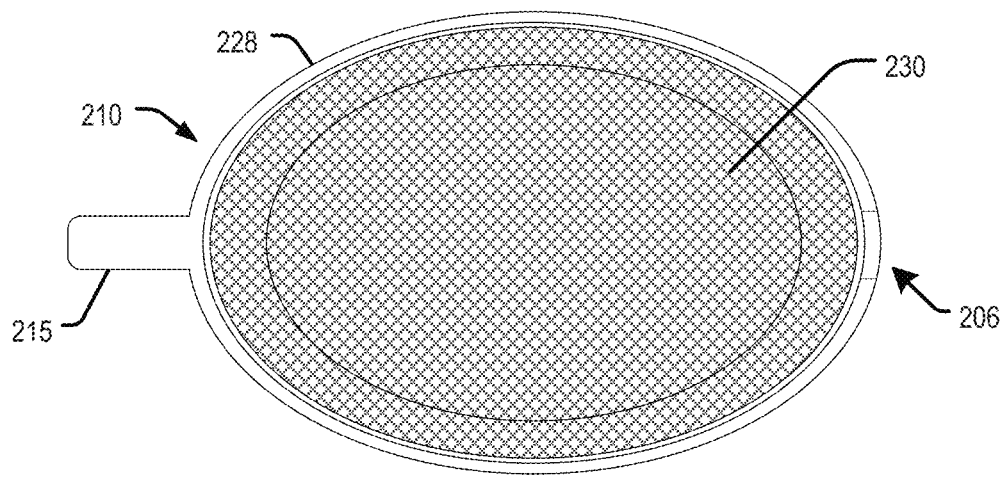
FIG. 2C is a top view of an example of a wafer coupled to the containment band of FIG. 2A.
Figure 2D:
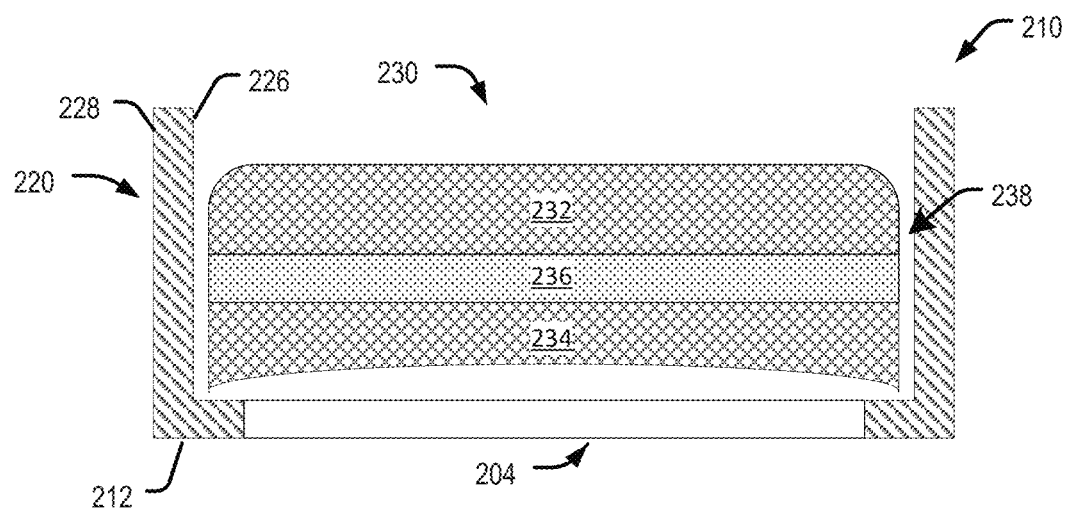
FIG. 2D is a sectional side view of the wafer and containment band of FIG. 2A.

Referring now to FIGS. 2A-2D aspects of a containment band 210, for use in manufacture of an optical article, are shown. For example, FIG. 2A shows a perspective view of a first example of containment band 210, FIG. 2B shows a sectional view of containment band 210, FIG. 2C shows a top view of containment band 210 coupled to a wafer 230, and FIG. 2D shows a sectional side view of wafer 230 and containment band 210.

Containment band 210 and wafer 230 may include or correspond to containment band 110 and wafer 130, respectively. For example, containment band 210 may be configured to prevent wafer 230 from contaminating a cavity (e.g., 142) of a mold (e.g., 140).

Containment band 210 includes a base 212 and one or more sidewalls 220 extending from the base. Base 212 and sidewall 220 may cooperate to secure wafer 230 and reduce contamination of during manufacturing of an optical article. In some implementations, containment band 210 may include a tab 215 (e.g., an alignment member) and/or a rib (e.g., 250). As shown in FIG. 2A, containment band 210 includes tab 215.

Base 212 may include a first surface 214 and a second surface 216 that is opposite the first surface 214. Additionally, base 212 includes a third surface 217 and a fourth surface 219 opposite the third surface 217. In some implementations, first surface 214 may correspond to an interior side and second surface 216 may correspond to an exterior side of base 212. In some implementations, base 212 includes a planar annular member extending between first surface 214 and second surface 216. The term annular member as used herein is not limited to a circle. For example, first surface 214 may be elliptical, circular, rounded, or otherwise shaped to form a bounded region that defines an opening 204. Additionally, or alternatively, second surface 216 may define a perimeter or periphery of at least a portion of base 212. Base 212 includes a width D1 measured from first surface 214 to second surface 216 along a straight line. Width D1 may be any suitable distance to receive wafer 230. For example, width D1 may be greater than or equal to any of, or between any two of, the following: 0.25, 0.5, 1, 2, 3, or 5 millimeters (mm). In some implementations, width D1 may be measured along a direction that is orthogonal to first surface 214, second surface 216, or both. Additionally, or alternatively, base 212 may have a distance D5 between third surface 217 and fourth surface 219, such as a distance along a straight line that is orthogonal to third surface 217, fourth surface 219, or both.

Sidewall 220 includes a first end 222, a second end 224, an inner surface 226 and an outer surface 228. As shown first end 222 is opposite second end 224. Inner and outer surfaces 226, 228 extend from first end 222 to second end 224 of sidewall 220. In some implementations, inner surface 226 may correspond to an interior surface and outer surface 228 may correspond to an exterior, opposing, surface of sidewall 220. To illustrate, sidewall 220 includes a thickness D8 measured from inner surface 226 to outer surface 228 along a straight line. Thickness D8 may be any suitable distance to receive and/or secure wafer 230. For example, thickness D8 may be greater than or equal to any of, or between any two of, the following: 0.25, 0.5, 0.75, 1, 2, 3 or 5 mm. Additionally, or alternatively, second end 224 may correspond to a top surface of sidewall 220 and first end 222 may correspond to a bottom or bottom surface of sidewall 220. In some such implementations, inner surface 226 defines an opening at second end 224 to receive at least a portion of wafer 230.

Sidewall 220 projects outwardly from base 212. In some implementations, sidewall 220 extends vertically upward from second surface 216 (e.g., periphery) of base 212 to contain wafer 130. In some implementations, sidewall 220 may extend in a direction that is substantially perpendicular (e.g., 90 degrees) to base 212. Additionally, or alternatively, an angle D6 between fourth surface 219 and inner surface 226. In the depicted implementations, base 212 and sidewall 220 are unitary. In this manner, first end 222 of sidewall 220 may corresponded to fourth surface 219 of base 212, however, in other implementations, first end 222 of sidewall(s) 220 may be coupled to base 212 in any suitable manner, such as via an adhesive or ultrasonic welding, as illustrative, non-limiting examples.

As shown in FIG. 2B, a cross-section of containment band 210 may resemble an "L" shape. In other implementations, sidewall may be angled (e.g., between 80 and 150 degrees depending on base curve of wafer 230) to securely couple containment band 210 to wafers of different sizes and shapes. For example, an angle D6, measured between fourth surface 219 of base 212 and inner surface 226 of sidewall 220 may be greater than or equal to any of, or between any two of, the following: 65, 75, 85, 90, 95, 105, 115, 125, or 135 degrees. In some implementations, angle D6 is sized to correspond to wafer 230. Sidewall 220 may surround a portion of base 212 (e.g., first surface 214) or first opening 204 to define a chamber configured to receive a wafer (e.g., 130). In some implementations, sidewall 220 may surround at least a majority of opening 204 to enable containment band 210 to be securely coupled to a wafer (e.g., 130) during manufacture of an optical article (e.g., 102). For example, sidewall 220 may form a cylindrical protrusion that extends upwardly from base 212. As shown in FIG. 2A, sidewall 220 defines a single opening (e.g., 206). Alternatively, in other implementations, sidewall 220 may define multiple openings (e.g., 206), as described further herein at least with reference to FIGS. 3 and 4. Additionally, or alternatively, in some implementations, sidewall 220 may surround an entirety of first opening 204 such that the sidewall does not define any openings (e.g., 206). In some of the foregoing implementations, an opening (e.g., 206) is oriented to align with an entrance gate of mold device 140 to allow for sufficient space for a moldable material (e.g., 148) to enter the mold cavity (e.g., 142) to reduce a force of the moldable material from moving the wafer within the mold cavity.

Sidewall 220 may be shaped and sized in any suitable manner to prevent contamination in a mold (e.g., 140) based on the wafer (e.g., 130) and mold cavity (e.g., 142). In some implementations, sidewall 220 includes a second distance D2 (e.g., an outer diameter) that defines a maximum transverse dimension of the containment band measured from opposing sides of outer surface 228 of sidewall 220 along a straight line. In some implementations, second distance D2 is greater than or equal to any of, or between any two of, the following: 50, 60, 70, 80, 90, 100, 110, 120, 130, 140, or 150 millimeters (mm) (e.g., between 70 and 100 mm, such as 80 mm); however, the outer diameter D2 may be dimensioned such that it is substantially equal to a diameter of a mold insert (e.g., 144, 146). In some implementations, outer surface 228 of sidewall 220 and second surface 216 of base 212 may be aligned such that an outer diameter of base 212 corresponds to outer diameter D2.

Containment band 210 may also include a third distance D3 (e.g., an inner diameter) that defines a distance measured between opposing sides of inner surface 226 of sidewall 220. In some implementations, third distance D3 is greater than or equal to any of, or between any two of, the following: 50, 60, 70, 80, 90, 100, or 110 millimeters (mm) (e.g., 70 mm); however, the outer diameter may be dimensioned such that it is substantially equal to an outer diameter of a wafer (e.g., 130). In some implementations, sidewall 220 may include a distance D4 (e.g., a height) measured from first end 222 of the sidewall to second end 224 of the sidewall along a straight line. In some implementations, distance D4 corresponds to a distance between fourth surface 219 of base 212 and second end 224 along a line substantially perpendicular to fourth surface 219, or a line from an intersection (e.g., corner) of fourth surface 219 and inner surface 226 to second end 224 (e.g., an edge surface) of sidewall 220. In some implementations, distance D4 of sidewall 220 is greater than or equal to any of, or between any two of, the following: 0.5, 1, 2, 3, 4, or 5 (mm).

Additionally, or alternatively, containment band 210 may include a fourth distance D7 (e.g., an opening diameter) that corresponds to a maximum transverse dimension of opening 204. For example, fourth distance D7 may be measured from opposing sides of first surface 214 of base 212 along a straight line. In some implementations, fourth distance, such as a diameter or maximum transverse dimension of opening 204, is greater than or equal to any of, or between any two of, the following: 1, 15, 25, 50, 60, 70, 80, 90, or 100 millimeters (mm). Fourth distance D7 is less than third distance D3 to allow base 212 to function as described herein.

Tab 215 (e.g., an alignment member) may extend from a portion of base 212 or sidewall 220 to orient containment band 210, such as to orient containment band 210 without directly touching base 212 or sidewall 220. Tab 215 may include or correspond to one or more features 115 (e.g., a recessed alignment member). As shown, tab 215 extends from base 212 in a direction away from opening 204. In some implementations, tab 215 may extend from second surface 216 of base 212 in a direction radially away from opening 204. In this way, containment band 210 and wafer 230 may be easily oriented while the containment band 210 is within a cavity of an injection mold (e.g., 140). In some implementations, tab 215 is co-planar with base 212. For example, a bottom surface of tab 215 may be co-planer with third surface 217 of base 212. In some such implementations, tab 215 includes a thickness that may be substantially equal to thickness D5 of base 212. In other implementations, a thickness of tab may be greater than or less than thickness D5. Additionally, or alternatively, tab 215 may be substantially perpendicular to at least a portion of sidewall 220. In some implementations, tab 215 is opposite of (e.g., 180° from) an opening (e.g., 206) of sidewall 220 to easily aid to orient containment band 210 while the band is within a mold cavity; however, tab 215 may be placed in any suitable manner depending on dimensions and shape of the mold cavity or wafer. Some implementations, do not include a tab (e.g., 215) and, in other implementations, containment band 210 include two or more tabs (e.g., 215) which may be positioned about base 212. Tab 215 may be unitary with base 212 and/or sidewall 220, however, in other implementations, the tab may be coupled to the base in any suitable manner. In such implementations, containment band 210 may include one or more additional features (e.g., one or more notches in sidewall 220) to assist with aligning the containment band within a mold (e.g., 140). The one or more notches, such a recess, groove, or depression, may include or correspond to one or more features 115.

Referring now to FIGS. 2C and 2D, containment band 210 may be operable with wafer 230 to prevent contamination from the wafer during a manufacturing process. For example, containment band 210 may surround a portion (up to and including all) of wafer 230 to prevent material from contaminating one or more components (e.g., mold insert, mold cavity, mold wall) used during the manufacturing process. For example, in some implementations, one or more sidewalls 220 collectively surround at least 25% of opening 204. As another example, one or more sidewalls may collectively surround 50%, 75%, or 90% of opening 204.

Wafer 230 may include a first layer 232 (e.g., a first surface), a second layer 234 (e.g., a second surface) and third layer 236 (e.g., inner layer) and an outer wall 238. In some implementations, wafer may include one or more additional layers. For example, wafer 230 may include an adhesive layer disposed between first layer 232 and third layer 236 and/or between second layer 234 and the third layer. Outer wall 238 (e.g., outer surface) may extend between top layer 232 and bottom layer 234 of wafer 130. In some implementations, outer wall 238 may intersect with top and bottom surfaces to define a periphery of wafer 230. As shown, top layer 232 and bottom layer 234 (e.g., outer layers) are coupled to opposing sides of inner layer 236 and overlie and underlie, respectively, the inner layer. Each layer (232, 234, 236)—e.g., a perimeter of each layer—may be elliptical, circular, or otherwise rounded such that the ends of each layer are aligned to form outer wall 238. In this way, outer wall 238 may be smoothed (e.g., not staggered) to form a high-quality optical article that may be easy mass produced without additional operations (e.g., machining, or other processes). In some implementations, wafer 230 may be convex and include a base curve between 0.1 to 12.0.

As shown in FIG. 2D, inner layer 236 is disposed between two outer layers (232, 234). Inner layer 236 (e.g., contamination layer) may include a soft matrix material that is susceptible to outflow at the elevated temperature and pressures experienced during an injection molding process. Under these injection molding process conditions (high temp. & pressure), the soft matrix material of inner layer 236 will flow out from between outer layers (232, 234) and contaminate one or more components (e.g., mold insert 144, insert 146, a space between inserts and sidewall 154) of a mold device (e.g., 140) as well as subsequent optical articles (e.g., 102) formed in the contaminated mold device. Such soft matrix materials may include, but are not limited to, thermoplastic elastomers (such as a thermoplastic polyurethane (TPU) (from Lubrizol Corporation, Tecoflex aliphatic polyether-based TPU product family, e.g., Tecoflex EG85A or Tecoflex EG80A; Lubrizol Corporation, Estane aliphatic TPU product family, e.g., Estane ALR E77A-V, Estane AG 8451, Estane VSN F5000); or semi-crystalline Polyether-block-polyamides (PEBA) (from Arkema S.A, Pebax® elastomers product family, e.g., Pebax 5533, Pebax 4533 and Pebax 4033), materials that soften, liquefy, or melt at temperatures near the molding temperature, and/or materials that will deform and flow under molding pressures. Top layer 232 and bottom layer 234 may include a harder thermoplastic material (e.g., polycarbonate) that may withstand the pressures and temperatures associated with injection molding without contaminating the mold. In some implementations, outer layer may include the same material as the injected material (e.g., 148) to facilitate bonding of the injection material with wafer 230.

Containment band 210 may be coupled to, and surround at least a portion (up to and including all) of wafer 230 to prevent material from inner layer 236 from contacting the components of the mold device. For example, containment band 210 at least partially surrounds outer wall 238 to capture soft pliable material escaping from inner layer 236. In this way, containment band 210 (e.g., sidewall 220) may be interposed between outer wall 238 of wafer 230 and components of injection mold device (e.g., 144, 146, 152) to prevent, or minimize, contamination. Accordingly, containment band 210 may enable easy removal of inserts (e.g., 144, 146) from mold block (e.g., 152), allow for faster manufacturing times, increased product yields, and decreased maintenance during the manufacture of an optical article (e.g., 102).

As shown, a concave surface (e.g., of layer 234) of wafer 230 faces base 212; however in other implementations, a convex surface (e.g., of layer 232) of the wafer may face base 212. In some implementations in which the convex surface faces base 212, a portion of wafer 230 may extend into or through opening 204. In some implementations, containment band 210 may contact at least a portion of outer wall 238 (e.g., outer surface of inner layer 236). In such implementations, containment band 210 may be coupled to wafer 230 via friction (e.g., from sidewall 220), via coupling means, such as adhesive, via a combination of friction and the coupling means, or the like. To illustrate, containment band 110 may be sized such that an inner diameter (e.g., D3) of sidewall 220 corresponds to an outer diameter of wafer 230. In some implementations, containment band 210 may be elastic (e.g., flexible) such that the containment band 210 applies a slight force on at least a portion of outer wall 238 of wafer 230 to secure the wafer during the manufacturing (e.g., injection molding) process. In other implementations, a clearance (e.g., gap) may be defined between containment band 210 and wafer 230. For example, containment band 210 may be sized so that a space (e.g., less than 1 mm) is formed between inner surface 226 of sidewall 220 and outer wall 238 of wafer 230. In this way, injected material (e.g., 148) may flow between the sidewall and the wafer to encapsulate any soft material extruded from a containment layer (e.g., 236) of wafer 230 and prevent contamination of the mold device (e.g., 140). In some implementations, sidewall 220 may define a groove that corresponds to a rib of wafer 230 such that the groove and rib may engage to securely couple the wafer and containment band 210 together.

In some implementations, opening 206 defined between sidewall 220 may allow injected material (e.g., 148) to flow through sidewall 220 such that the injected material can bond to outer wall 238 of wafer 230. In some implementations, opening 206 is sized so that a small area of wafer 230 is exposed while the wafer is coupled to containment band 210. The exposed area (e.g., portion of outer wall 238 not surrounded by sidewall 220) may be kept small (e.g., less than 10% of the surface area of outer wall 238) to prevent material from a contaminant layer (e.g., 236) from contacting mold device (e.g., 140). In this way, the injected material (e.g., 148) is able to encapsulate any material that oozes out from wafer 230 at opening 206.

Figure 3:
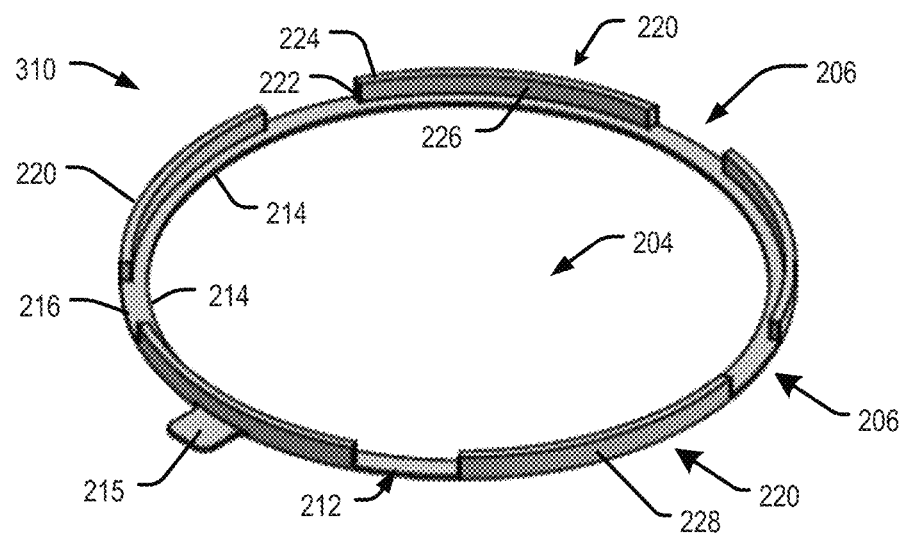
FIG. 3 is a perspective view of another example of a containment band.
Figure 4:
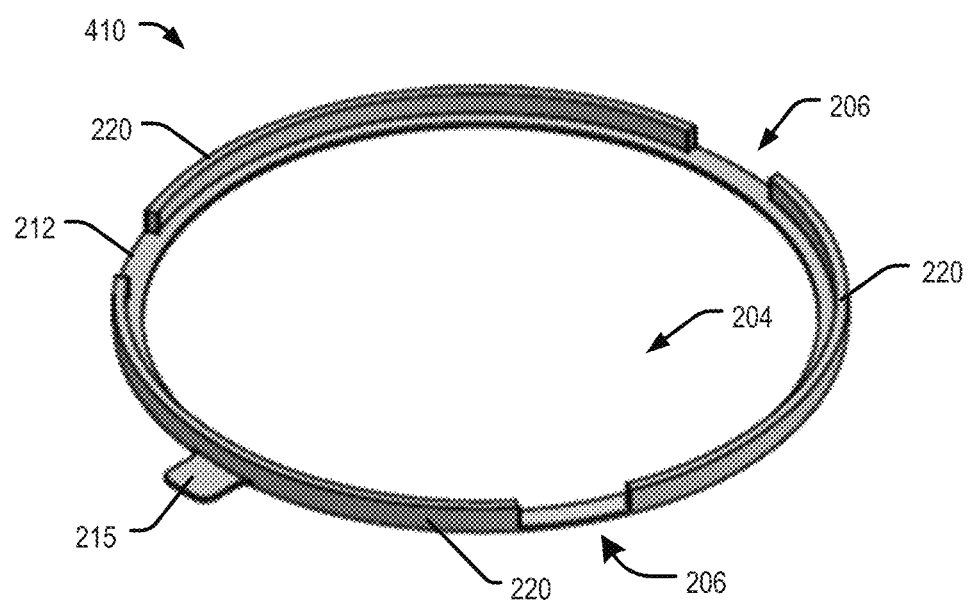
FIG. 4 is a perspective view of another example of a containment band.

Referring now to FIGS. 3 and 4, additional examples of containment bands for use in manufacture of an optical article, are shown. For example, FIG. 3 shows a perspective view of an example of a containment band 310, and FIG. 4 shows a perspective view of an example of a containment band 410. Containment bands 310, 410 may include or correspond to containment band 110 and/or 210 and may be configured to prevent a wafer (e.g., 130, 230) from contaminating a cavity (e.g., 142) of a mold device (e.g., 140).

As shown in FIGS. 3 and 4, containment bands 310, 410 may include a plurality of sidewalls 220. For example, FIG. 3 depicts an implementation having five sidewalls (e.g., 220) that define five second openings 206 and FIG. 4 depicts an implementation having three sidewalls (e.g., 220) that define three second openings. In other implementations, the containment band may include more than five sidewalls or fewer than three sidewalls. Sidewalls 220 may surround (e.g., collectively surround) a portion of base 212 (e.g., first surface 214) or first opening 204. In some implementations, each sidewall 220 have substantially equal arc lengths. Alternatively, at least on sidewall may have an arc length that is different from an arc length of at least one other sidewall. In some such implementations, each sidewall 220 may, but need not, be equally spaced along base 212. In this manner, the second openings 206 defined by adjacent sidewalls 220 may be equally spaced along containment band and enable injection material to bond with outer wall 238 in a balanced manner.

The plurality of sidewalls 220 extend outwardly from base 212. Each sidewall 220 may be moveable relative to one other sidewall such that wafer 230 may be quickly and efficiently coupled to (e.g., disposed within) containment band 210. For example, at least one sidewall is flexible and can be deflected from a first position to a second position, and return from the second position toward or to the first position. Each sidewall may cooperate to define a chamber or cavity configured to receive wafer 230. In some implementations, the plurality of sidewalls 220 may collectively surround at least a majority of opening 204 to enable containment band 210 to be securely coupled to wafer 230 during manufacture of an optical article (e.g., 102). In other implementations, the plurality of sidewalls 220 collectively surround at least 25% of opening 204.

In some implementations, sidewalls 220 define a plurality of openings 206. Each opening 206 may allow injected material (e.g., 148) to flow through sidewall 220 so that the injected material can bond to wafer 230 during injection molding. In some implementations, opening 206 may be defined by a gap between two adjacent sidewalls of the plurality of sidewalls 220. In some implementations, opening 206 is sized so that an exposed area of a wafer is small enough to prevent pliable material (e.g., from third layer 236) of wafer 230 from contaminating a mold. For example, each opening 206 may span a length along a perimeter (e.g., 216) of base 212 that is less than, or less than or equal to, 15% of the total length of the perimeter (e.g., 10 mm) of the base to allow molding material to contact wafer without risk of the wafer moving during the injection molding process. In this way, containment band 210 may prevent contamination of a mold and the injected material (e.g., 148) is able to encapsulate any material that oozes out from a wafer at opening 206.

In some implementations, containment band 210 is used for making an article (e.g., optical article 102). For example, containment band 210 may include annular base 212 that defines first opening 204 configured to receive wafer 230 and define one or more sidewalls 220 that project from and surround at least a portion of first opening 204. In some implementations, one or more sidewalls 220 may define one or more second openings 206. During formation of the article (e.g., 102), a first portion (e.g., 232) of wafer 230 may be in contact with one or more sidewalls 220 and each of the one or more second openings 206 are configured enable passage of an injection material (e.g., 148) to form the article. In some implementations, containment band 210 includes tab 215 that extends from annular base 212 in a second direction that is away from first opening 204. In some implementations, each of the one or more sidewalls 220 includes inner surface 226 that faces first opening 204 and outer surface 228 that is opposite inner surface 226.

In some of the foregoing implementations, annular base 212 includes first surface 214 that defines first opening 204 and second surface 216 that defines a periphery of the annular base. In some implementations, containment band 210 includes tab 215 that extends from second surface 216. Additionally, or alternatively, one or more sidewalls 220 may be positioned proximate to second surface 216 and extends from annular base 212 in a direction that is substantially perpendicular to annular base 212. In some implementations, height D4 of sidewall 220 from a top surface of annular base 212 is between 1 to 5 millimeters (mm). In some implementations, a distance D2 (e.g., an outer diameter) of annular base 212 is between 50 to 150 mm.

In some implementations, containment band 210 is configured to be utilized to form an optical article. The optical article may include wafer 230, a mold material (e.g., 148), and/or at least a portion of containment band 210 for preventing mold contamination during manufacture of the optical article. Wafer 230 includes at least one thermoplastic layer (232, 234, 236). In some implementations, containment band 210 includes base 212 having a periphery (e.g., 216) and at least one sidewall 220 extending from the periphery of the base to contact wafer 230. Sidewall 220 may define one or more openings 206 configured to be occupied by the mold material during an injection molding process. In some implementations, sidewall 220 surrounds a majority of the wafer 230. In some such implementations, the wafer 230 is disposed within the periphery (e.g., 216) of the base 212 and in contact with inner surface 226 of sidewall 220. Containment band 210 may include a thermoplastic polymer having a higher glass transition temperature than the at least one thermoplastic layer (e.g., 236) of wafer 230.

Referring now to FIGS. 5A and 5B, FIG. 5A shows a sectional view of an example of a containment band 510 and FIG. 5B shows a side sectional view of containment band 510 coupled to wafer 230. Containment band 510 is removably coupleable to optical wafer 230 in any manner described above to secure wafer 230 within a mold cavity (e.g., 142) and prevent edge bleed of the wafer. Containment band may include or correspond to containment band 110, 210, 310, 410.

Containment band 510 includes a base 212 and one or more sidewalls 220 that may be coupled to, and surround at least a portion (up to and including all) of wafer 230 to prevent material from inner layer 236 from contacting the components of the mold device. In some implementations, containment band 510 includes a single sidewall 220 (e.g., as shown in FIGS. 2A-2D), while in other implementations, containment band 510 includes a plurality of sidewalls 220 (e.g., as shown in FIGS. 3 and 4).

Rib 350 (e.g., a securement member) may extend from a portion of sidewall 220 to assist in coupling wafer 230 to containment band 510. As shown, rib 350 extends from at least one sidewall 220 in a direction toward opening 204. For example, rib 350 may extend radially inward from sidewall 220. To illustrate, rib 350 may extend from inner surface 226 of sidewall 220 to contact an outer surface of wafer 230, when the wafer is coupled to containment band 510. In this way, containment band 510 may be securely coupled to wafer to prevent relative movement between the wafer and the band and enable manufacture of high-quality optical articles. In the depicted implementations, rib 350 extends from inner surface 226 of sidewall 220 below second end 224; however, in other implementations, rib 350 may extend from the inner surface at the second end such that the sidewall does not extend above the rib. In some implementations, rib 350 may be parallel to base 212. Additionally, or alternatively, rib 350 may be substantially perpendicular to at least a portion of sidewall 220. Rib 350 may be unitary with base 212 and/or sidewall 220, however, in other implementations, the rib may be coupled to the sidewall in any suitable manner.

In some implementations, each sidewall of the one or more sidewalls 220 includes a corresponding rib 350. In other implementations, at least one sidewall of the one or more sidewalls does not include rib 350 and at least one other sidewall of the one or more sidewalls includes rib 350. Additionally, or alternatively, at least one sidewall (e.g., 220) may include multiple rib sections (e.g., 350) such that a gap or space is interposed two adjacent rib sections. Rib 350 may include or correspond to one or more features 115. Although rib 350 has been described with reference to containment band 510, one or more ribs 350 may be incorporated into containment band 110, 210, 310, 410.

In some implementations, containment band 510 may contact at least a portion of outer wall 238 (e.g., outer surface of inner layer 236). In such implementations, containment band 510 may be coupled to wafer 230 via friction (e.g., from sidewall 220 and/or rib 350). In some implementations, containment band 510 may be elastic (e.g., flexible) such that the containment band 510 applies a slight force on at least a portion of outer wall 238 and/or a top surface (e.g., 232) of wafer 230 to secure the wafer during the manufacturing (e.g., injection molding) process. For example, rib 350 may contact wafer 230 to prevent movement of the wafer when coupled to containment band 510. In some implementations, a clearance (e.g., gap) may be defined between at least a portion of containment band 510 and wafer 230. For example, containment band 510 may be sized so that a space (e.g., less than 1 mm) is formed between inner surface 226 of sidewall 220 and outer wall 238 of wafer 230. In this way, rib 350 may secure wafer 230 and an injected material (e.g., 148) may be able to flow between the sidewall and the wafer to encapsulate any soft material extruded from a contamination layer (e.g., 236) of wafer 230 and prevent contamination of the mold device (e.g., 140). In some implementations, opening 206 defined between sidewall 220 may allow injected material (e.g., 148) to flow through sidewall 220 such that the injected material can bond to outer wall 238 of wafer 230 as described herein.

As described above, the containment band (e.g., 110, 210, 310, 410, 510) may be customized to enable the containment band to securely couple to various wafers having different wafer geometries (e.g., size, base curve, etc.). Containment band configuration may also be customized based on a desired optical article to be formed. As an illustrative, non-limiting example, in an implementation where the containment band will be removed after the injection molding process, a containment band (e.g., 210) having a single sidewall 220 may be used and, in other implementations where the containment band is included in the finished optical article, a containment band (e.g., 310, 410) having multiple sidewalls 220 may be used.

In some implementations, containment band 510 is used in making an optical article (e.g., 102). For example, containment band 510 includes an annular base 212 that defines first opening 204 configured to receive wafer 230 and one or more sidewalls 220 that project a first direction from and surround at least a portion of the first opening. In some such implementations, one or more sidewalls 220 may define one or more second openings 206. In some implementations, during formation of the optical article, a first portion of the wafer is in contact with one or more sidewalls 220 and each of one or more second openings 206 are configured enable passage of an injection material (e.g., 148) to form the optical article. In some implementations, each sidewall 220 includes inner surface 226 that faces first opening 204 and outer surface 228 that is opposite the inner surface. Some implementations include a member (e.g., 350) extending from at least a portion of inner surface 226 of at least one sidewall 220.

Figure 6:
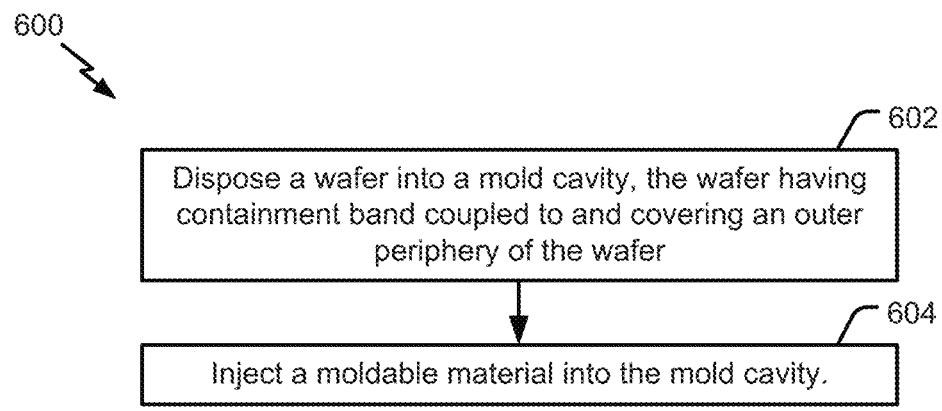
FIG. 6 is a flowchart illustrating an example of a method of forming an optical article.

Referring to FIG. 6, an example of a method 600 of forming an optical article is shown. Method 600 may be performed by one or more components of system 100, such as containment band 110, 210, 310, 410, 510, wafer 130, 230, mold device 140, or moldable material 148. In some implementations, method 600 may be performed or initiated by a control device or a control system, such as a processor coupled to memory. Method 600 includes forming an optical article (e.g., lens). The optical article may include or correspond to optical article 102. In some implementations, optical article is a semi-finished lens, while in other implementations, optical article 102 is a finished lens.

Method 600 includes disposing a wafer into a mold cavity, at 602. For example, wafer may include or correspond to wafer 130, 230, and mold cavity may include or correspond to cavity 142. In some implementations, the wafer includes containment band coupled to and covering an outer periphery of the wafer. The containment band may include or correspond to containment band 110, 210, 310.

Method 600 also includes injecting a moldable material into the mold cavity, at 604. The moldable material is consolidated (e.g., via heat and pressure) to bond the moldable material to the wafer and/or the containment band. The moldable material may include or correspond to moldable material 148. In some implementations, method 600 may include heating the moldable material to a molten state and injecting the moldable material into the mold cavity.

In some implementations, method 600 may include coupling the containment band to the wafer. For example, coupling the containment band to the wafer may include inserting the wafer into the containment band such that the containment band disposed around a periphery of the wafer. In some such implementations, the wafer may be inserted into the containment band such that at least a majority of the containment band is disposed around the periphery of the wafer.

In some implementations, method 600 includes forming the containment band. For example, the containment band may be formed by injection molding. As another example, the containment band may be formed by 3D printing. Additionally, or alternatively, method 600 may include forming a wafer having at least three layers in which a middle layer of the wafer includes a thermoplastic matrix material. The thermoplastic matrix material of the middle layer of the wafer may have a glass-transition temperature that is less than a glass transition temperature of one of the other layers of the wafer.

In some implementations, method 600 includes setting the moldable material to form a semi-finished lens including the wafer, the containment band, and the moldable material. Additionally, or alternatively, method 600 may include forming a finished lens from the semi-finished lends by removing at least a portion of the containment band from the semi-finished lens. Forming the optical member (e.g., finished lens) may include molding, coating, surfacing, milling, edging, laser etching, grinding, polishing, or the like, or a combination thereof, as illustrative, non-limiting examples.

In some implementations, method 600 may include removing the optical article (e.g., semi-finished lens or finished lens) from the mold cavity. After removing the optical article, method 600 may also include inserting a second wafer coupled to a second containment band into the mold cavity. As described above, method 600 enables manufacturing of an optical article without contamination of a mold (e.g., mold cavity, insert, receiver). Accordingly, method 600 enables faster manufacturing times, increased product yields, and decreased maintenance during the manufacture of the optical article.

The above specification and examples provide a complete description of the structure and use of illustrative implementations. Although certain implementations have been described above with a certain degree of particularity, or with reference to one or more individual implementations, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and implementations other than the one shown may include some or all of the features of the depicted implementation. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one implementation or may relate to several implementations.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A containment band for use in making an article, the containment band comprising:
   an annular base that defines a first opening, said annular base including a first surface, a second surface opposite the first surface, a third surface and a fourth surface opposite the third surface, said first surface corresponding to an interior side of the annular base, thus defining the first opening, and said second surface corresponding to an exterior side of the annular base, thus defining a periphery of the base; and
   multiple sidewalls that project a first direction from and surround at least a portion of the first opening, each of said sidewalls comprising a first end, a second end, an inner surface facing the first opening, and an outer surface opposite the inner surface, and said multiple sidewalls defining a plurality of second openings; and
   wherein, during formation of the article, a first portion of a functional wafer is in contact with the multiple sidewalls and each of the plurality of second openings is configured to enable passage of an injection material to form the article, and
   wherein the first end of each of the multiple sidewalls corresponds or is coupled to the fourth surface of the annular base.

2. The containment band of claim 1, further comprising:
   an alignment member extending from the annular base in a second direction that is away from the first opening.

3. The containment band of claim 2, further comprising a securement member extending from at least a portion of the inner surface of at least one of the multiple sidewalls.

4. The containment band of claim 2, wherein
   the
   alignment member extends from the second surface of the annular base.

5. The containment band of claim 4, wherein the multiple sidewalls are positioned proximate to the second surface and extend from the annular base in a direction that is substantially perpendicular to the annular base.

6. The containment band of claim 1, wherein:
   an outer diameter of the annular base is between 50 to 150 millimeters (mm).

7. An optical article comprising:
   a wafer;
   an injected moldable material; and
   the containment band according to claim 1.

8. The optical article of claim 7, wherein an angle between each of the multiple sidewalls and the base is between 80 and 150 degrees.

9. The optical article of claim 7, wherein:
   the wafer includes at least one thermoplastic layer; and
   the wafer is disposed within the periphery of the base and in contact with the inner surface of each of the multiple sidewalls.

10. The optical article of claim 9, wherein the containment band comprises a thermoplastic polymer having a higher glass transition temperature than the at least one thermoplastic layer of the wafer.

11. A method of forming a lens comprising:
    disposing a wafer into a mold cavity, the wafer having a containment band coupled to and covering an outer periphery of the wafer; and
    injecting a moldable material into the mold cavity,
    wherein the containment band comprises the containment band of claim 1.

12. The method of claim 11, further comprising:
setting the moldable material to form a semi-finished lens or a finished lens comprising the wafer, the containment band, and the moldable material.

13. The method of claim 12, further comprising:
forming a finished lens from the semi-finished lens by removing at least a portion of the containment band from being coupled to the wafer.

14. The containment band of claim 6, wherein a height of each of the multiple sidewalls is between 1 to 5 mm.

* * * * *